United States Patent [19]

Vara et al.

[11] Patent Number: 4,983,425

[45] Date of Patent: Jan. 8, 1991

[54] VAPOR PHASE HARDENING OF CURABLE ORGANIC COMPOUNDS

[75] Inventors: Fulvio J. Vara, Chester; James A. Dougherty, Pequannock, both of N.J.

[73] Assignee: GAF Chemicals Corporation, Wayne, N.J.

[21] Appl. No.: 401,693

[22] Filed: Sep. 1, 1989

[51] Int. Cl.$^5$ .......................... B05D 3/04; B05D 3/10
[52] U.S. Cl. .................................... 427/340; 427/341; 427/386; 427/389.7; 427/393.5; 502/203
[58] Field of Search ............ 427/340, 341, 386, 393.5, 427/389.7; 502/203

[56] References Cited

U.S. PATENT DOCUMENTS 4,396,649  8/1983  Bailey et al. .................. 627/386
4,766,252  8/1988  Vara et al. .................... 427/44 X Primary Examiner—Michael Lusignan
Attorney, Agent, or Firm—Marilyn J. Maue; Joshua J. Ward

[57] ABSTRACT

This invention relates to a process for hardening a curable normally liquid hydrocarbon compound optionally substituted with an alkyloxy, ester aldehyde, amido, halo, sulfonate, sulfate, sulfite, mercapto or nitro group and containing at least one functional radical selected from the group of

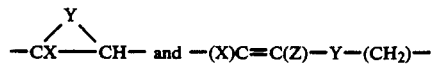

and

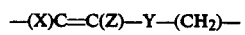

wherein Y is —O—, —S— or —NH— and X and Z are each independently hydrogen, alkylene having from 1 to 20 carbon atoms, aryl or a mixture thereof, which process comprises contacting said liquid for less than one minute with a hardening amount of a volatilized hard Lewis acid under anhydrous conditions and at a hardening temperature below the deformation temperature of any substrate material which may be used to support said liquid.

15 Claims, No Drawings

VAPOR PHASE HARDENING OF CURABLE ORGANIC COMPOUNDS

BACKGROUND OF THE INVENTION

Vapor Permeation Cure (VPC) using vaporized basic materials such as tertiary amine catalysts are well documented in the prior art and described for example in U.S. Pat. Nos. 4,343,924; 4,365,039; 4,366,193 and references incorporated therein. This method of curing is preferred over prior baking procedures for certain heat sensitive substrates, particularly certain thermoplastics, photographic films and several coating compositions required to meet certain minimum performance specifications such as mar and deformation resistance and minimal discoloration. Vapor phase curing is effected within a shortened period of time, usually less than one minute, and at significantly reduced temperatures; thus minimizing substrate deformation. In practice however, these prior processes are found to have several drawbacks and unexpected impediments in their synthesis schemes, among which is the need for a resin dispersion solvent and other additives to achieve uniform coatings. Also, some amino vapor cure processes still require temperatures at which many substrates undergo some degree of deformation. For example, the Vapor Permeation Cure described in U.S. Pat. No. 2,967,117 on a coating of polyhydroxy polyester and polyisocyanate is cured at 80°–120° C. in the presence of gaseous tertiary amine or phosphine. The addition of fugitive solvents which are subsequently removed and other additives unnecessarily add to the cost and efficiency of such curing processes and, in some instances, diminish beneficial properties of the coating material by dilution of their effectiveness.

Accordingly, it is an object of the present invention to overcome the shortcomings and difficulties encountered in the above noted processes and to provide a hardened or fully cured, more concentrated coating having infinitely extended shelf-life which coating can be simultaneously applied and cured on a substrate within a few seconds of exposure at room temperature by a vapor phase process.

Another object of the invention is to provide a more efficient, more economical vapor hardening process for heat sensitive coatings or coated substrates.

These and other objects and advantages of the invention will become apparent to the skilled artisan from the following description and disclosure.

THE INVENTION

In accordance with this invention, a curable normally liquid monomeric and/or polymeric organic compound is subjected to hardening or curing by passing the uncured liquid through a gas chamber where it is exposed for less than one minute, preferably from 2 to 30 seconds, to a volatile, hard Lewis acid vapor under anhydrous conditions and at a hardening temperature below the deformation or degradation temperature of the organic compound or any substrate used as a support therefor. Usually a temperature within the range of between about 10° and about 60° C. is sufficient to achieve a fully cured product. The present hardening process can be carried out under batch or continuous operation, as desired.

The volatile, hard Lewis acids of the present invention, as opposed to soft acids, have a high positive oxidation state and their valence electrons are not readily excited. Also, acids of this type combine preferentially with hard bases. The volatile acids useful in the present invention include boron trihalides such as the fluoride, chloride or bromide compounds; boron trihalide etherate complexes, hydrogen fluoride, etc. or mixtures thereof. The volatile acid can be employed in a pure state if desired, since it is non-explosive and non-flammable; however, to facilitate better dispersion in the gas treatment chamber and to realize a more economical operation in the efficient use of the acid vapor it is recommended that it be diluted with an inert anhydrous gas such as nitrogen, helium, carbon dioxide, oxygen, etc. When employed in a diluted state, the concentration of the acid is between about 0.01 and about 15%, preferably between about 0.5 and about 5% of the gaseous mixture.

The hydrocarbon compounds which are hardened or cured by the present process are those optionally substituted with an alkyloxy, ester, aldehyde, amido, halo, sulfonate, sulfite, sulfate, mercapto or nitro group and containing at least one of the functional radicals,

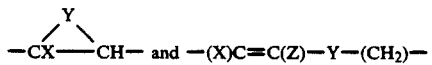

and/or

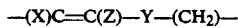

wherein Y is —O—, —S— or —NH— and X and Z are each independently hydrogen, alkylene having from 1 to 20 carbon atoms, aryl or a mixture thereof.

Of the curable liquids used in this invention monomeric and polymeric liquid mixtures of aliphatic and/or aromatic vinyl ethers are preferred.

Noteable among the aromatic materials treated by the process of this invention are diglycidyl ether of bisphenol A, polyglycidyl ether of phenol formaldehyde resins, vinyl ethers of ethoxylated di- and tri- hydric phenols, mixtures of these compounds with aliphatic vinyl ethyl ether or vinyl ether compounds such as divinyl ether of triethylene glycol, divinyl ether of cyclohexane dimethanol, etc. Most preferred is a mixture of the divinyl ether of triethylene glycol and diglycidyl ether of bisphenol A. Among the aliphatic materials suitable for treatment by this process are 3,4-epoxy cyclohexyl methyl-3',4'-epoxy cyclohexane carboxylate, limene, diepoxide, xama, etc. or mixtures of these compounds with vinyl ethyl ether or vinyl ether resins.

Substrates on which the curable liquid of this invention is coated are conventional and include thermoplastic and thermosetting plastics as well as glass, ceramics, metal, wood, rubber and other substrates. Such heat sensitive substrates as polyesters are particularly benefited by the low temperature treatment of instant invention. Such materials were excluded from the vapor curing of prior vapor processes such as disclosed in U.S. Pat. No. 2,967,117 which require curing temperatures of 80°–120° C. The coating applied is 100% reactive, thus solvents which are normally used to reduce viscosity of the coating are not needed.

In operation, the non-hardened or uncured organic ether, thioether or imine is contacted for a short period with the acid catalyst vapor or vapor mixture at a hardening temperature below the decomposition temperature of the uncured liquid and below the deformation temperature of the substrate on which the liquid is either supported or chemically bonded. Usually, the hardening treatment of this invention is effected at ambient temperature within about 2 to about 15 seconds. During operation, a slight vacuum is beneficially maintained in the treating zone so as to minimize escape of acid vapors.

The contacting of vapors and liquid is effected by any of the known conventional methods. For example, the uncured liquid supported or bonded to a substrate can be exposed by rapidly passing the coated substrate through the gas treating chamber. Alternatively, uncured liquid feed can be sprayed into the gas treating zone in contact with a separate spray of the gaseous catalyst or the catalyst and liquid components can be contacted in a premixing spray nozzle, e.g. in a mole ratio of from about 0.1:1 to about 8:1, before being deposited on a support. In any of the above discussed operations, the coated or uncoated support can be passed through the gas chamber at a rate which is dependent on the length of the chamber to allow a dwell time or exposure time of from about 0.2 to about 1 minute or the acid gas or acid gas/liquid spray can be passed over the stationary substrate to provide a supported product coating which is hardened or fully cured to a nondiscolored film of high toughness, having infinitely extended shelf life and resistance to UV degradation. In some cases, this method of curing enhances the bonding strength between the substrate and the coating material. The hardened products of this invention are also highly moisture and oxidation resistant.

The present monomeric or polymeric ether, thioether and imine compounds or mixtures thereof are normally liquid and require no solvent for dispersion when subjected to the low temperature hardening treatment of this invention. Accordingly, a hardened fully cured product is directly produced and the mild conditions employed avoids degradation of valuable properties initially possessed by the liquid coating compounds or compositions.

Because of the normally liquid state of the present curable compounds, extremely thin hardened films, as low as 0.05 mil thickness, can be directly achieved by instant process. However, the hardening treatment is not limited to curing of thin films but is suitably applied to substrates having surface coatings up to 5 mils or higher coating thicknesses.

Having generally described the invention, reference is now had to the accompanying examples which illustrate preferred embodiments but which are not to be construed as limiting to the scope of the invention as more broadly set forth above and in the appended claims.

EXAMPLE 1

A coating mixture of the following composition was formulated:

| Ingredient | Wt. % |
| --- | --- |
| triethyleneglycol divinyl ether | 50.00 |
| diglycidyl ether of Bisphenol A (Epon 828) | 50.00 |

The above liquid resinous mixture was applied to a glass plate in a 0.2 mil thickness without the use of solvent which is normally required to reduce the viscosity of other resins.

An acidic gaseous mixture of 0.1% $BF_3$ and 99.9% nitrogen was generated and injected into a gas chamber from a vapor mixing valve and the above coated glass plate was then introduced into the chamber and exposed at about 22° C. for 0.5 seconds, after which it was removed.

The resulting product had a strongly adhering, hard coating which underwent no color change and which had high abrasion and scratch resistance.

EXAMPLE 2

Using a paint spray gun, the resinous liquid of Example 1 was atomized using a mixture of 0.1% gaseous $BF_3$ etherate in dry nitrogen under 40 psi. The liquid droplets were deposited on an aluminum substrate to provide a 0.5 mil coating.

The resulting coating had high gloss, was strongly adhering and provided a solvent and scratch resistant protective film.

Example 1 was repeated except that divinyl ether of cyclohexane dimethanol was substituted for triethylene glycol divinyl ether. Example 1 was again repeated for each of the following polymers:divinyl ether of triethylene glycol/polyglycidyl phenol-formaldehyde resin; divinyl ether of triethylene glycol/epoxidized polybutadiene and divinyl ether of triethylene glycol/3,4-epoxycyclohexane carboxylate. The resulting coatings in each of these examples was identical with that obtained in Example 1.

EXAMPLE 3

A coating mixture of the following composition was formulated:

| Ingredient | Wt. % |
| --- | --- |
| divinyl ether of ethoxylated bisphenol A | 50.00 |
| divinyl ether of triethylene glycol | 50.00 |

The above liquid resinous mixture, in the absence of solvent, was applied to a glass plate in a 0.5 mil thickness at room temperature.

An acidic gaseous mixture of 0.1% $BF_3$, and 99.9% nitrogen was generated and injected into a gas chamber from a vapor mixing valve and the above coated glass plate was then introduced into the chamber and exposed at about 22° C. for 0.5 seconds, after which it was removed.

The resulting product had a strongly adhering, hard coating which underwent no color change and which had high abrasion and scratch resistance.

EXAMPLE 4

A coating mixture of the following composition was formulated:

| Ingredient | Wt. % |
| --- | --- |
| divinyl ether of cyclohexanedimethanol | 50.00 |
| glycidyl ether of phenol-formaldehyde condensate (EPOXY NOVALAC DEN-431) | 50.00 |

The above liquid resinous mixture, in the absence of solvent, was applied to a glass plate in a 0.5 mil thickness at room temperature.

An acidic gaseous mixture of 0.1% $BF_3$, and 99.9% nitrogen was generated and injected into a gas chamber from a vapor mixing valve and the above coated glass plate was then introduced into the chamber and exposed at about 22° C. for 0.5 seconds, after which it was removed.

The resulting product had a strongly adhering, hard coating which underwent no color change and which had high abrasion and scratch resistance.

It is to be understood that in the above examples, the curable, normally liquid hydrocarbon can be replaced with any of the aforementioned curable, substituted or unsubstituted hydrocarbons to provide the adhering hard coatings described above. It will also be understood that other hard Lewis acids described herein can be substituted in these examples to provide substantially the same described benefits.

What is claimed is:

1. A process for curing a curable normally liquid ether, thioether or imine material by contacting said material for less than 1 minute in a treating zone with an effective polymerizing amount of a volatile, hard Lewis acid in the vapor state in an anhydrous atmosphere at a temperature below the deformation temperature of any substrate used as a support for said material to produce a hardened, moisture and oxidation resistant product.

2. The process of claim 1 wherein said curable material is a hydrocarbon compound optionally substituted with an alkyloxy, ester, aldehyde, amido, halo, sulfate, sulfonate, sulfite, mercapto or nitro group and containing at least one radical selected from the group of

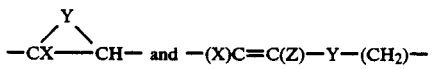

and

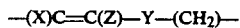

wherein Y is —O—, —S— or —NH— and X and Z are each independently hydrogen, alkylene having from 1 to 20 carbon atoms, aryl or a mixture thereof.

3. The process of claim 2 wherein said curable material is a mixture of monomeric and polymeric compounds.

4. The process of claim 1 wherein said curable material is coated on a plastic substrate prior to treatment and wherein said curing is effected at a temperature below the deformation temperature of said substrate.

5. The process of claim 4 wherein said curing is effected at a temperature between about 10° C. and about 60° C.

6. The process of claim 1 wherein said volatile acid is a boron halide or lower alkyl etherate complex thereof.

7. The process of claim 6 wherein said volatile acid is a mixture of boron trifluoride and hydrogen fluoride.

8. The process of claim 1 wherein the curing is carried out under a slight vacuum sufficient to prevent escape of acid vapors from the treating zone.

9. The process of claim 2 wherein said mixture is a mixture of aromatic vinyl ethers.

10. The process of claim 3 wherein said mixture is a mixture containing the divinyl ether of ethoxylated resorcinol monomer and diglycidyl ether of bisphenol A polymer.

11. The process of claim 3 wherein said mixture is a mixture containing the divinyl ether of ethoxylated resorcinol monomer and polyglycidyl ether of phenol-formaldehyde resin.

12. The process of claim 2 wherein said mixture is a mixture containing 3,4-epoxycyclohexyl methyl 3',4'-epoxycyclohexyl carboxylate monomer and the divinyl ether of ethoxylated bisphenol monomer.

13. The process of claim 1 wherein the volatile, hard Lewis acid is employed in admixture with an inert gas and wherein the concentration of said acid in said inert gas is between about 0.01 and about 15 wt. %.

14. The process of claim 13 wherein the concentration of said acid is between about 0.5 and about 5 wt. % of said gaseous mixture.

15. The process of claim 13 wherein said inert gas is selected from the group consisting of nitrogen, helium, carbon dioxide, oxygen and ozone.

* * * * *